United States Patent [19]

Courtin

[11] 4,314,818
[45] Feb. 9, 1982

[54] 1-AMINO-7-[3'-(5"-CHLORO-2",4"-DIFLUOROPYRIMIDYL-6"-AMINO)-6'-SULFOPHENYLAZO]-8-HYDROXY-2-SULFAMOYL OR SUBSTITUTED SULFAMOYL-PHENYLAZO NAPHTHALENE-3,6-DISULFONIC ACIDS

[75] Inventor: Alfred Courtin, Basel, Switzerland

[73] Assignee: Sandoz Ltd., Basel, Switzerland

[21] Appl. No.: 177,017

[22] Filed: Aug. 11, 1980

[30] Foreign Application Priority Data

Aug. 6, 1979 [CH] Switzerland ............... 7517/79

[51] Int. Cl.³ .................. C09B 62/00; C09B 33/02
[52] U.S. Cl. ............................. 8/549; 8/689;
260/154; 260/174; 260/185; 544/326
[58] Field of Search ............ 8/549, 689; 260/184,
260/185, 154, 174; 544/294, 326

[56] References Cited

U.S. PATENT DOCUMENTS 3,669,951 6/1972 Bien et al. .................. 260/146
3,966,705 6/1976 Oesterlein et al. ............ 260/185

FOREIGN PATENT DOCUMENTS 1644204 6/1978 Fed. Rep. of Germany .

Primary Examiner—A. Lionel Clingman
Attorney, Agent, or Firm—Gerald D. Sharkin; Richard E. Vila; Melvyn M. Kassenoff

[57] ABSTRACT

Compounds of the formula

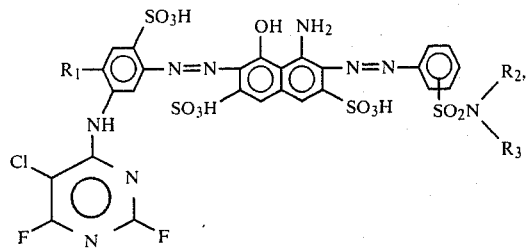

in which
$R_1$ is hydrogen or methyl,
either $R_2$ is hydrogen; $C_{1-6}$alkyl; $C_{1-4}$alkyl monosubstituted by halo or phenyl; $C_{2-4}$alkyl monosubstituted in the 2-, 3- or 4-position by hydroxy or $C_{1-2}$alkoxy; $C_{5-7}$cycloalkyl; $C_{5-7}$cycloalkyl substituted by one to three $C_{1-4}$alkyl groups; phenyl; phenyl substituted by one or two substituents selected from the group consisting of halo, $C_{1-4}$alkyl and $C_{1-4}$alkoxy; or —CH$_2$CH$_2$SO$_3$H, and
$R_3$ is hydrogen or $C_{1-6}$alkyl,
or $R_2$ and $R_3$, together with the nitrogen atom to which they are bound, form a 5- or 6-membered saturated heterocyclic ring, and mixtures thereof, which compounds are in free acid or salt form, useful for dyeing and printing hydroxy group-containing and amido group-containing organic substrates such as natural and synthetic polyamides (e.g., wool, silk and nylon) and natural and regenerated cellulose (e.g., cotton, viscose and spun rayon).

18 Claims, No Drawings

1-AMINO-7-[3'-(5"-CHLORO-2",4"-DIFLUOROPYRIMIDYL-6"-AMINO)-6'-SULFOPHENYLAZO]-8-HYDROXY-2-SULFAMOYL OR SUBSTITUTED SULFAMOYL-PHENYLAZO NAPHTHALENE-3,6-DISULFONIC ACIDS

The present invention relates to disazo compounds containing a fibre-reactive group, their production and use as dyestuffs.

More particularly, the present invention provides disazo compounds of formula I,

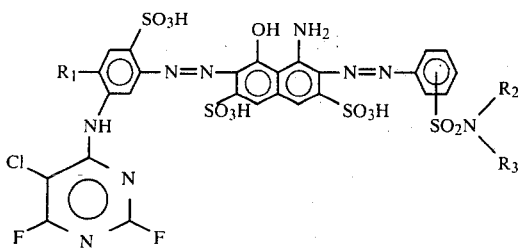

in which $R_1$ is hydrogen or methyl, either $R_2$ is hydrogen; $C_{1-6}$alkyl; $C_{1-4}$alkyl monosubstituted by halogen or phenyl; $C_{2-4}$-alkyl monosubstituted in the 2-, 3- or 4-position by hydroxy or $C_{1-2}$alkoxy; $C_{5-7}$cycloalkyl optionally substituted by up to three $C_{1-4}$alkyl groups; phenyl optionally substituted by up to two substituents selected from the group consisting of halogen, $C_{1-4}$alkyl and $C_{1-4}$alkoxy; or —$CH_2CH_2SO_3H$, and $R_3$ is hydrogen or $C_{1-6}$alkyl, or $R_2$ and $R_3$, together with the nitrogen atom to which they are bound, form a saturated 5-or 6-membered heterocyclic ring optionally containing a further hetero atom, and mixtures thereof, which compounds and mixtures are in free acid or salt form.

By halogen is meant fluorine, chlorine or bromine. Any unsubstituted alkyl radical as $R_2$ and/or $R_3$ is linear or branched and preferably contains 1 to 4 carbon atoms, more preferably 1 or 2 carbon atoms, with methyl being especially preferred.

Any substituted alkyl as $R_2$ is preferably linear and the alkyl portion preferably contains 1 to 3 carbon atoms when the substituent is halogen or phenyl and 2 or 3 carbon atoms when the substituent is hydroxy or $C_{1-2}$alkoxy. The preferred halogen substituents are chlorine and bromine. The preferred substituents on such alkyl as $R_2$ are hydroxy, phenyl, chlorine, bromine, methoxy and ethoxy.

Any cycloalkyl as $R_2$ preferably contains 5 or 6 carbon atoms and is preferably cyclohexyl. Any substituted cycloalkyl is preferably cyclohexyl substituted by up to three methyl groups. Most preferably any cycloalkyl as $R_2$ is unsubstituted cyclohexyl.

Any halogen substituents on phenyl as $R_2$ are preferably chlorine and bromine. Any substituted phenyl as $R_2$ is preferably substituted by up to two substituents selected from the group consisting of chlorine, methyl, methoxy and ethoxy. Most preferably any phenyl as $R_2$ is unsubstituted.

When $R_2$ and $R_3$, together with the nitrogen atom to which they are bound, form a saturated heterocyclic ring they preferably form a pyrrolidine, piperidine or morpholine ring.

$R_1$ is preferably hydrogen.

Preferably $R_2$ is $R_2'$, where $R_2'$ is hydrogen; $C_{1-4}$alkyl; $C_{1-3}$alkyl monosubstituted by chlorine, bromine or phenyl; $C_{2-3}$alkyl monosubstituted in the 2- or 3-position by methoxy, ethoxy or hydroxy; phenyl; or —$CH_2CH_2SO_3H$. More preferably $R_2$ is $R_2''$, wherein $R_2''$ is hydrogen, methyl, ethyl, phenyl, benzyl or —$CH_2CH_2SO_3H$. Most preferably $R_2$ is $R_2'''$, where $R_2'''$ is hydrogen, methyl, ethyl or —$CH_2CH_2SO_3H$, with hydrogen being especially preferred.

$R_3$ is preferably $R_3'$, where $R_3'$ is hydrogen or $C_{1-4}$alkyl; more preferably $R_3$ is $R_3''$, where $R_3''$ is hydrogen, methyl or ethyl, with hydrogen being especially preferred.

The group —$SO_3NR_2R_3$ is preferably in the 4-position relative to the azo group.

Preferred compounds of formula I are (i) those in which $R_2$ is $R_2'$ and $R_3$ is $R_3'$ or $R_2$ and $R_3$, together with the nitrogen atom to which they are bound, form a pyrrolidine, piperidine or morpholine ring;

(2) those in which $R_2$ is $R_2'$ and $R_3$ is $R_3'$;

(3) those in which $R_2$ is $R_2''$ and $R_3$ is $R_3''$;

(4) those in which $R_2$ is $R_2'''$ and $R_3$ is $R_3''$, especially hydrogen;

(5) those of (1) to (4) in which the —$SO_2NR_2R_3$ group is in the 4-position;

(6) those in which $R_2$ and $R_3$ are both hydrogen and the sulphonamide group is in the 4-position;

(7) those of (1) to (6) in which $R_1$ is hydrogen.

When the compounds of formula I are in salt form, the cations of the sulpho groups are not critical and may be any of those non-chromophoric cations conventional in anionic reactive dyestuffs. Examples of suitable cations include alkali metals and substituted and unsubstituted ammonium cations such as lithium, sodium, potassium, ammonium, mono-, di-, tri- or tetramethylammonium, triethylammonium and mono-, di- of triethanolammonium. Preferred cations are alkali metal and ammonium cations, with sodium being most preferred. Preferably the compounds of formula I are in salt form.

The present invention further provides a process for the production of compounds of formula I, or a mixture thereof, comprising coupling a diazotized amine of formula II

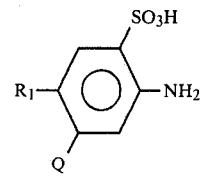

or a mixture thereof, in which Q is a protected amino group or the group of the formula

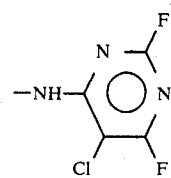

with a compound of formula III,

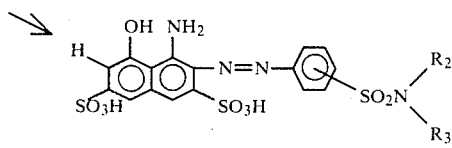

or a mixture thereof, in a weakly acid to weakly alkaline medium, and when Q is a protected amino group splitting off the same and condensing the free amino group with 2,4,6-trifluoro-5-chloropyrimidine.

Diazotization and coupling are effected in accordance with known methods. The preferred protecting group in Q is an acetyl group. The saponification of the protecting group is effected by known methods as is the condensation reaction with 2,4,6-trifluoro-5-chloropyrimidine.

The compounds of formula I may be isolated in accordance with known methods, for example by salting out, filtering and drying in vacuo. In general, owing to the process/isolation conditions the compounds of formula I are obtained in salt form or in mixed salt form; however, the free acid form of the compounds of formula I may be obtained therefrom in accordance with known methods.

The amines of formula II are known. The compounds of formula III may be prepared in accordance with known methods, for example, by coupling the diazotized sulphonamido-substituted aniline with 1-amino-8-hydroxynaphthalene-3,6-disulphonic acid in an acid medium. The sulphonamido-substituted anilines are prepared in accordance with known methods, for example, by reacting acetylaminobenzene sulphonylchloride with the amine $HNR_2R_3$ in weakly acid to weakly alkaline medium, preferably at temperatures of from 20° to 80° C., followed by splitting off the protecting group.

The compounds of formula I and mixtures thereof are useful as reactive dyestuffs for dyeing and printing hydroxyl group- and/or amino group-containing organic substrates. Preferred substrates are textiles consisting of or comprising natural or synthetic polyamides such as wool, silk or nylon, and natural or regenerated cellulose such as cotton, viscose and spun rayon.

The compounds of formula I exhaust well and have good build-up power and are thus especially suitable for dyeing by the exhaust dyeing methods. Exhaust dyeing is carried out in accordance with conventional methods for reactive dyes and especially deep dyeings are obtained with good fixation yields. Good dyeings are also obtained by the pad batch (short bath) process (up to 100° C.) and by the continuous process.

The dyeings obtained have notable wet fastenesses such as wash-, water- and sweat-fastness. Furthermore, the unbound dyestuff is easily removed from the substrate by washing.

The dyestuffs of the invention may also be employed for dyeing in combination with other dyestuffs.

The following Examples further serve to illustrate the invention. In the Examples all parts are by weight and the temperatures are in degrees Centigrade.

EXAMPLE 1

A solution of 13.8 parts sodium nitrite in 150 parts water is added dropwise, at a temperature not exceeding 7°, over a period of 20 minutes to a solution of 34.7 parts sulphanilamide in 300 parts water and 60 parts 30% hydrochloric acid; subsequently, the reaction mixture is stirred for 30 minutes at the same temperature. A solution of 63.8 parts 1-amino-8-hydroxynaphthalene-3,6-disulphonic acid and 100 parts urea in 300 parts water, adjusted to pH 5.6 with 30% aqueous sodium hydroxide, is added over 30 minutes to the resulting diazonium-salt suspension. Coupling is complete in 90 minutes. The reaction mixture is adjusted from pH 1.2–1.5 to pH 6.0–6.5 with 30% aqueous sodium hydroxide whereby the monoazo dyestuff formed goes into solution.

68.9 Parts 30% hydrochloric acid are added with vigorous stirring to a suspension of 67.3 parts 1-amino-3-(5'-chloro-2',6'-difluoropyrimidyl-4')-aminobenzene-6-sulphonic acid in 400 parts water. At a temperature not exceeding 12° a solution of 13.8 sodium nitrite in 50 parts water is added dropwise thereto over 40 minutes and the whole is then stirred for a further 30 minutes. The resulting diazonium-salt suspension is poured onto the solution of the monoazo compound obtained as described above. The pH of the reaction mixture is adjusted to a value of 6.0 to 6.5 by the addition of 20% aqueous sodium carbonate solution and is kept at this value. Coupling is complete in 30 minutes and 405 parts sodium chloride are added (portionwise) thereto. The mixture is stirred for 30 minutes and the precipitated dyestuff is isolated and dried at 80°–100° in vacuo. The dyestuff obtained is, in the free acid form, of formula

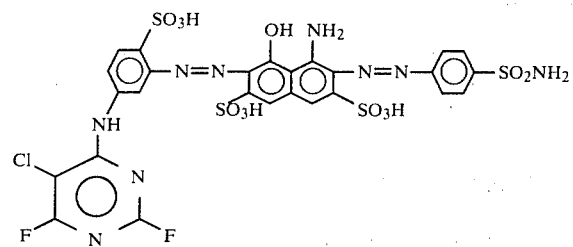

and dyes cotton navy blue by the exhaust dyeing method with good fixation yield when the amount of dyestuff is chosen so as to give a standard depth dyeing.

In analogy with the procedure described in Example 1, the compounds of formula I with $R_1 = H$ given in the following Table may be prepared. The position of the $—SO_2NR_2R_3$ is with respect to the azo group. Taking the amount of each dyestuff which is required to give a standard depth dyeing, the dyestuffs of the Table give navy blue dyeings on cotton.

TABLE

| Example No. | $R_2$ | $R_3$ | position $—SO_2NR_2R_3$ |
|---|---|---|---|
| 2 | H | H | 2 |
| 3 | H | H | 3 |
| 4 | CH₃ | H | 4 |
| 5 | " | CH₃ | 4 |
| 6 | " | " | 3 |
| 7 | C₂H₅ | H | 4 |
| 8 | C₂H₅ | C₂H₅ | 4 |
| 9 | CH₃ | H | 3 |
| 10 | " | H | 2 |
| 11 | n-C₄H₉ | H | 3 |
| 12 | " | H | 4 |
| 13 | C₂H₅ | H | 2 |
| 14 | —CH₂CH₂SO₃Na | H | 4 |
| 15 | " | H | 3 |
| 16 | " | H | 2 |
| 17 | " | CH₃ | 2 |
| 18 | " | " | 3 |
| 19 | " | " | 4 |
| 20 | Isopropyl | H | 3 |

TABLE-continued

| Example No. | $R_2$ | $R_3$ | position $-SO_2NR_2R_3$ |
|---|---|---|---|
| 21 | $-CH_2CH_2OH$ | H | 3 |
| 22 | " | H | 4 |
| 23 | " | $CH_3$ | 4 |
| 24 | $-CH_2CH_2CH_2OH$ | H | 3 |
| 25 | " | H | 4 |
| 26 | Benzyl | H | 4 |
| 27 | " | $CH_3$ | 4 |
| 28 | " | H | 2 |
| 29 | Cyclohexyl | H | 4 |
| 30 | " | $CH_3$ | 4 |
| 31 | Phenyl | H | 4 |
| 32 | $R_2$ and $R_3$ together with the nitrogen atom: Morpholinyl | | 4 |
| 33 | p-tolyl | H | 4 |

The dyestuffs of Examples 1 to 33 may be obtained in forms other than the sodium salt form in accordance with known methods by choosing the appropriate reaction/isolation conditions.

Application Example 0.6 Parts of the dyestuff of Example 1 are dissolved in 200 parts water. 10 parts cotton are put in the dyebath and the temperature is raised to 40° within 10 minutes. 10 parts Glauber's salt are then added followed 30 minutes later by 4 parts soda. Dyeing is continued for a further 60 minutes. Then the dyed substrate is rinsed cold and then hot. The dyeing is soaped at the boil for 20 minutes in 500 parts water containing 0.25 parts sodium alkylsulphonate detergent. After rinsing, a deep dyeing of a navy blue shade is obtained.

What is claimed is:

1. A compound of the formula

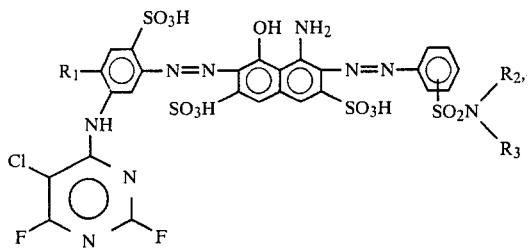

or a salt thereof each cation of which is non-chromophoric, wherein
$R_1$ is hydrogen or methyl,
$R_2$ is hydrogen; $C_{1-6}$alkyl; $C_{1-4}$alkyl monosubstituted by halo or phenyl; $C_{2-4}$alkyl monosubstituted in the 2-, 3- or 4-position by hydroxy or $C_{1-2}$alkoxy; $C_{5-7}$cycloalkyl; $C_{5-7}$cycloalkyl substituted by one to three $C_{1-4}$alkyl groups; phenyl; phenyl substituted by one or two substituents selected from the group consisting of halo, $C_{1-4}$alkyl and $C_{1-4}$alkoxy; or $-CH_2CH_2SO_3H$, and
$R_3$ is hydrogen or $C_{1-6}$alkyl, or
$R_2$ and $R_3$, taken together and with the nitrogen atom to which they are bound, form a saturated 5- or 6-membered heterocyclic ring containing no further hetero atom or a saturated 5- or 6-membered heterocyclic ring containing a further hetero atom,
wherein each halo is independently fluoro, chloro or bromo, or a mixture of such compounds in free acid or salt form.

2. A compound according to claim 1, or a salt thereof each cation of which is non-chromophoric.

3. A compound according to claim 2, or a salt thereof each cation of which is independently lithium, sodium, potassium, ammonium, methylammonium, dimethylammonium, trimethylammonium, tetramethylammonium, triethylammonium, ethanolammonium, diethanolammonium, or triethanolammonium.

4. A compound according to claim 2, or a salt thereof each cation of which is non-chromophoric, wherein $R_2$, when a substituted alkyl group, is $C_{1-3}$alkyl monosubstituted by phenyl, chloro or bromo or $C_{2-3}$alkyl monosubstituted in the 2- or 3-position by hydroxy, methoxy or ethoxy.

5. A compound according to claim 2, or a salt thereof each cation of which is non-chromophoric, wherein $R_2$, when a cycloalkyl or substituted cycloalkyl group, is cyclohexyl or cyclohexyl substituted by one to three methyl groups.

6. A compound according to claim 2, or a salt thereof each cation of which is non-chromophoric, wherein $R_2$, when a substituted phenyl group, is phenyl substituted by one or two substituents selected from the group consisting of chloro, methyl, methoxy and ethoxy.

7. A compound according to claim 2, or a salt thereof each cation of which is non-chromophoric, wherein $R_2$ is hydrogen, methyl, ethyl, phenyl, benzyl or $-CH_2CH_2SO_3H$.

8. A compound according to claim 2, or a salt thereof each cation of which is non-chromophoric, wherein $R_3$ is hydrogen, methyl or ethyl.

9. A compound according to claim 8, or a salt thereof each cation of which is non-chromophoric, wherein $R_3$ is hydrogen.

10. A compound according to claim 2, or a salt thereof each cation of which is non-chromophoric, wherein
$R_2$ is hydrogen; $C_{1-6}$alkyl; $C_{1-4}$alkyl monosubstituted by halo or phenyl; $C_{2-4}$alkyl monosubstituted in the 2-, or 3- or 4-position by hydroxy or $C_{1-2}$alkoxy; cyclohexyl; phenyl or $-CH_2CH_2SO_3H$, and
$R_3$ is hydrogen or $C_{1-6}$alkyl, or
$R_2$ and $R_3$, taken together and with the nitrogen atom to which they are bound, form a saturated 5- or 6-membered heterocyclic ring containing no further hetero atom or a saturated 5- or 6-membered heterocyclic ring containing a further hetero atom.

11. A compound according to claim 10, or a salt thereof each cation of which is non-chromophoric, wherein
$R_2$ is hydrogen; $C_{1-4}$alkyl; $C_{1-3}$alkyl monosubstituted by chloro, bromo or phenyl; $C_{2-3}$alkyl monosubstituted in the 2-or 3-position by hydroxy, methoxy or ethoxy; phenyl or $-CH_2CH_2SO_3H$, and
$R_3$ is hydrogen or $C_{1-4}$alkyl, or
$R_2$ and $R_3$, taken together and with the nitrogen atom to which they are bound, form a pyrrolidine, piperidine or morpholine ring.

12. A compound according to claim 11, or a salt thereof each cation of which is non-chromophoric, wherein
$R_2$ is hydrogen; $C_{1-4}$alkyl; $C_{1-3}$alkyl monosubstituted by chloro, bromo or phenyl; $C_{2-3}$alkyl monosubstituted in the 2- or 3-position by hydroxy, methoxy or ethoxy; phenyl or $-CH_2CH_2SO_3H$, and
$R_3$ is hydrogen or $C_{1-4}$alkyl.

13. A compound according to claim 12, or a salt thereof each cation of which is non-chromophoric, wherein $R_2$ is hydrogen, and $R^3$ is hydrogen.

14. A compound according to claim 11, or a salt thereof each cation of which is non-chromophoric, wherein $R_1$ is hydrogen.

15. A compound according to claim 2, or a salt thereof each cation of which is non-chromophoric, wherein the —SO$_2$NR$_2$R$_3$ group is para to the azo radical.

16. The compound according to claim 31 having the formula

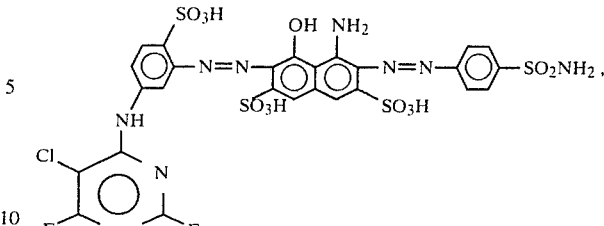

or a salt thereof each cation of which is non-chromophoric.

17. The compound according to claim 16 in sodium salt form.

18. A process for dyeing or printing a hydroxy group-containing or amido group-containing organic substrate comprising applying to a hydroxy group-containing or amido group-containing organic substrate, as a dyeing or printing agent, a compound according to claim 1, or a salt thereof each cation of which is non-chromophoric, or a mixture of such compounds in free acid or salt form.

* * * * *